April 22, 1941. G. A. TOWER 2,239,064
WATER MOTOR
Filed July 11, 1939 4 Sheets-Sheet 1
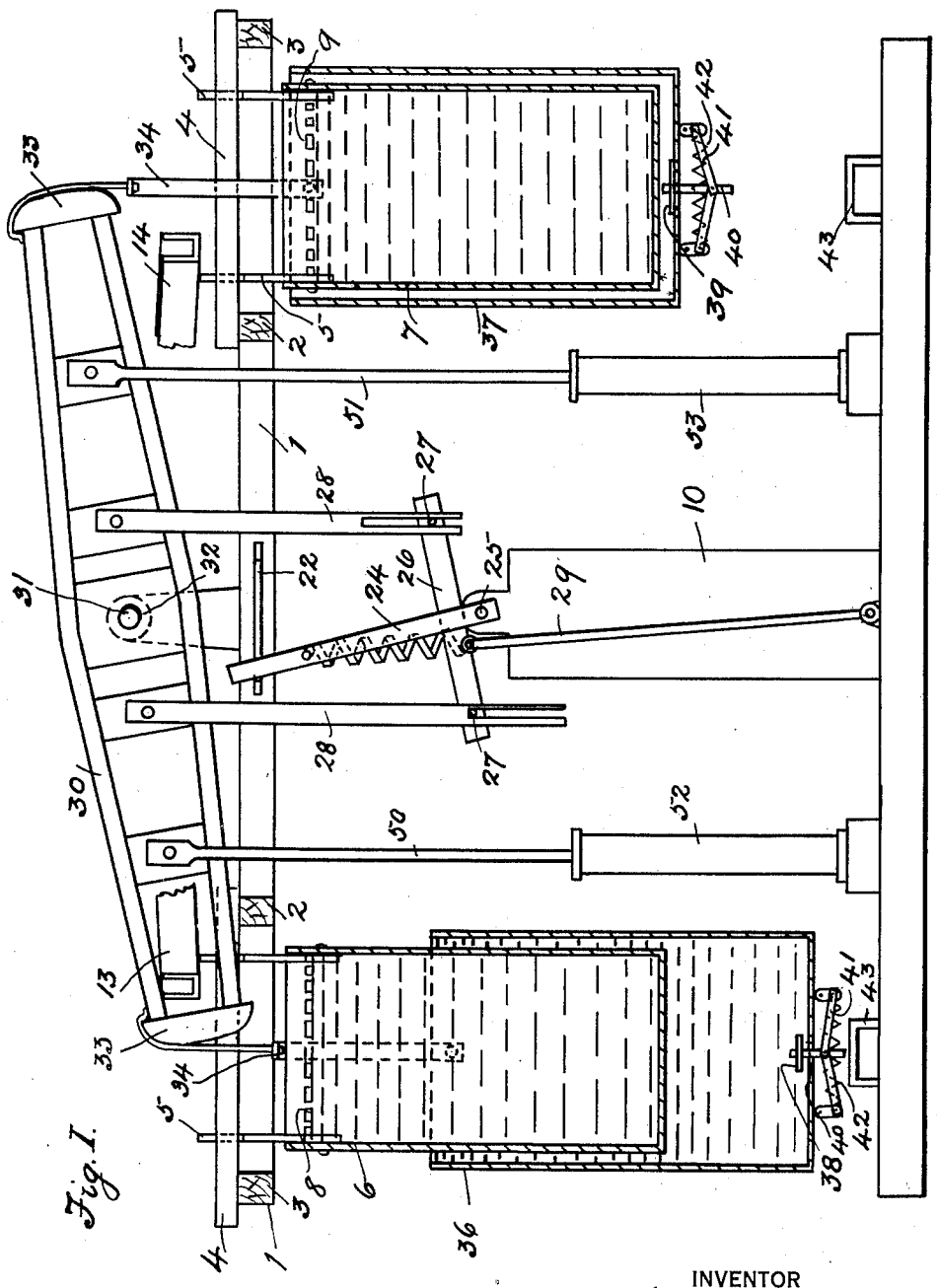
INVENTOR
George A. Tower
BY
Arthur Scrivenor,
ATTORNEY

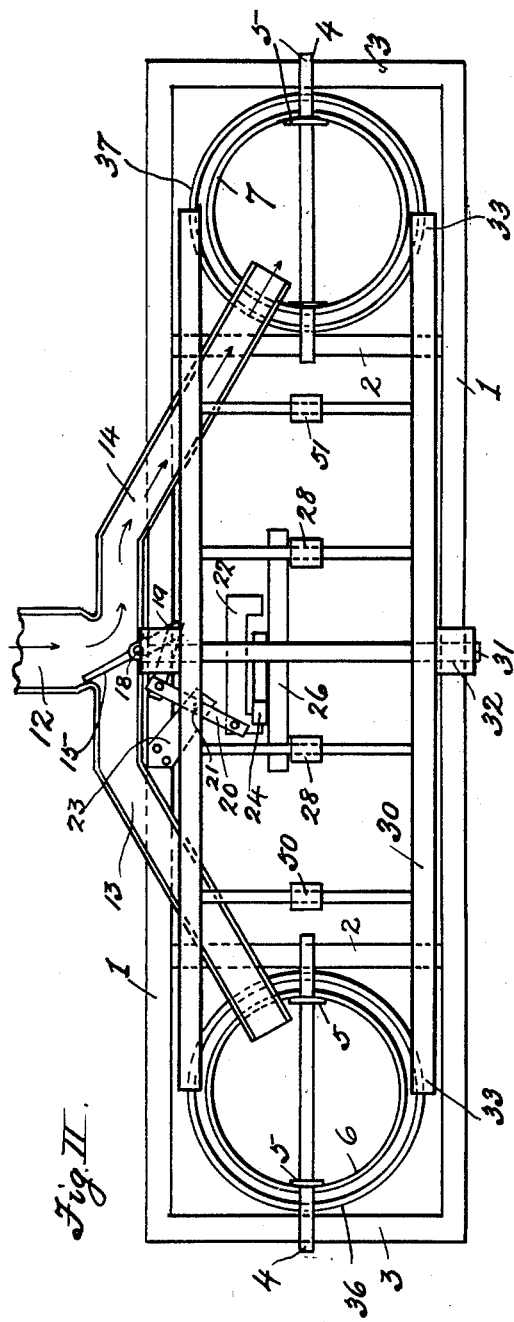

April 22, 1941.  G. A. TOWER  2,239,064
WATER MOTOR
Filed July 11, 1939  4 Sheets—Sheet 3
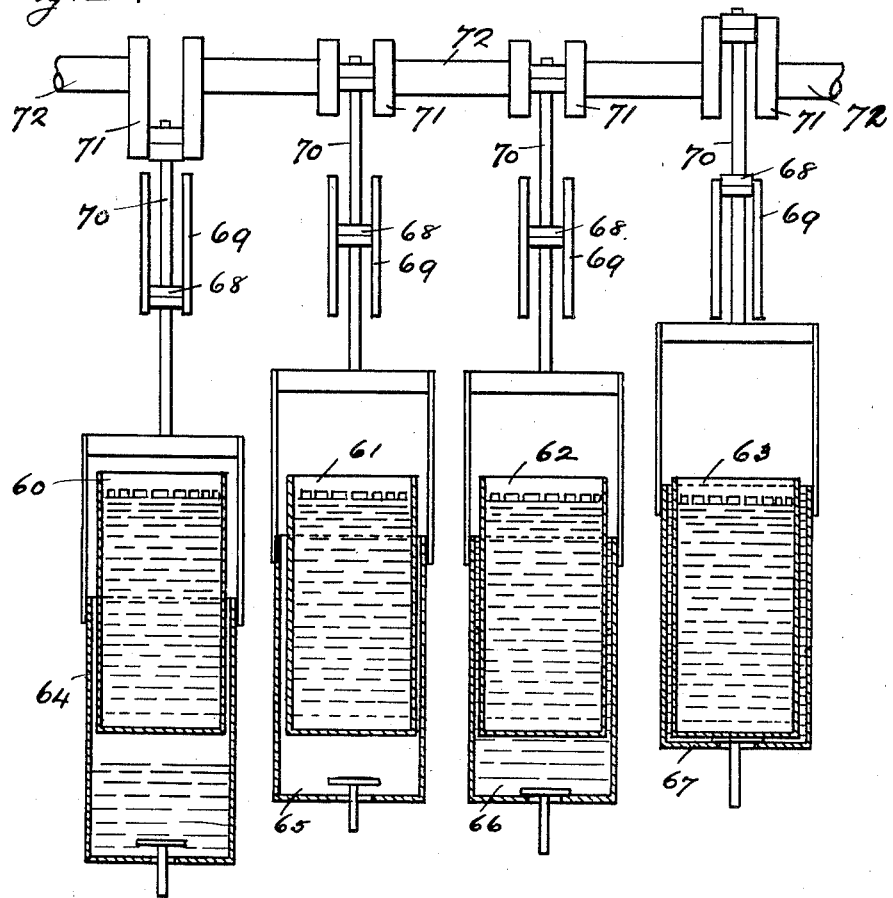
Fig. III.
INVENTOR
George A. Tower.
BY
Arthur Scrivener
ATTORNEY

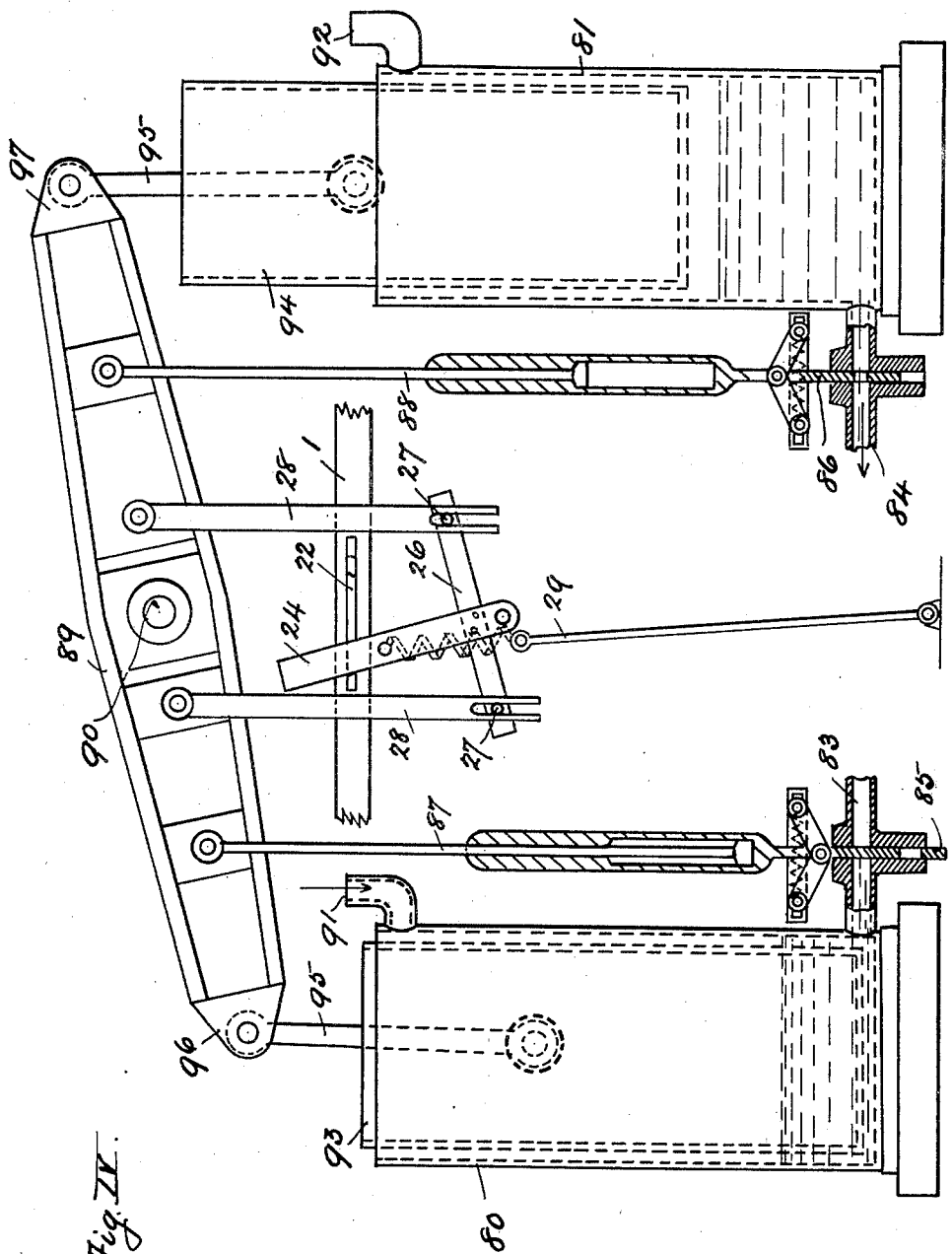

Patented Apr. 22, 1941

2,239,064

UNITED STATES PATENT OFFICE 2,239,064

WATER MOTOR

George A. Tower, Richmond, Va.

Application July 11, 1939, Serial No. 283,756

8 Claims. (Cl. 253—19)

My invention relates to liquid motors: and it is a device for utilizing the pressure of a liquid as principally determined by its head when held in a container. If a shallow container, holding say a gallon of water, be suspended from a scale-beam, the downward pull on the beam will be that due to the weight of the water and of the container; and the pressure per square inch on the bottom of the container will be that due to the depth of the water in the container. Now if a container of the same weight and capacity but of greater height and smaller cross-section be substituted for the shallow container, and a gallon of water be poured into it, the pull on the scale-beam will, as before, be that due to the weight of the container and of the water; but the pressure per square inch on the bottom of the second container will be greater than is the pressure per square inch on the bottom of the shallow container; this increased pressure, per square inch, being due to the increased head of the water in the second container.

We also know from the laws of hydrostatics that, in the same liquid, the pressure varies with the depth; that when a body is immersed in water, the upward pressure of the water against the body varies with the depth below the surface; and that a body immersed in a fluid is pressed upward by a force equal to the weight of the fluid displaced.

In the drawings which accompany this specification: Figure I shows my liquid motor in elevation and part vertical section; Figure II shows the motor in plan; Figure III shows a particular application of my motor; Figure IV shows an alternate arrangement of the working parts of the motor.

In Figure I, 1 is a frame-work which is supported in any suitable way. 2 and 2 are cross-bars. Spanning the spaces between these cross-bars and the end members 3, 3 of the frame, are cross-pieces 4, 4; and from each of these cross-pieces are suspended by lugs 5 the tanks 6 and 7. These tanks are open at the top, but are otherwise closed. Note that these tanks are stationary. Around the upper wall of these tanks there is arranged a row of perforations 8 and 9. The tanks are filled with water, to give them weight; and when the water rises to and above the perforations it flows through them, and down the outside of the tanks.

A water trough 12 is arranged above the level of the tanks 6 and 7; and from the trough 12 branch troughs 13 and 14 are arranged to carry water from trough 12 to the tanks 6 and 7, respectively. The flow from trough 12 to branch troughs 13 and 14 is controlled by the valve 15. In Figure II the valve 15 is set to direct the flow of water by the branch trough 14 to the tank 7. The valve 15 has just been thrown to the position shown, and the water is just about to flow through the branch trough 14 to tank 7; in which tank the water level already stands at the perforations 9. At the same time the flow of water by the branch trough 13 to the tank 6 is cut off.

The valve 15 is pivoted at 18, and is connected by link 19 and bell-crank 20 to the sliding piece 22. The bell-crank 20 is pivoted at 21 on the bracket 23, bolted to the frame 1.

Referring to Figures I and II: the sliding piece 22 is moved by the oscillating bar 24, pivoted at 25, and to which is fixed the cross-arm 26, in the ends of which are heavy pins 27. When the bar 24 is caused to oscillate, it strikes the sliding piece 22, and the valve 15 is thrown to one side or the other.

Balanced above the frame 1 is the beam 30, mounted on the bearing 31 carried in the blocks 32, which are supported on the frame. The ends 33 of beam 30 are each one over the center of one of the tanks 6 and 7.

Of larger diameter than the tanks 6 and 7, and hung around them by slings 34, attached to the ends of the beam 30, are the tanks 36 and 37. These tanks are open at the top; and in the bottom each one has a spring-controlled valve; in tank 36, the valve 38; and in tank 37, the valve 39. These valves are supported on stems 40, and they are controlled by the spring-actuated links 41. The springs 42 are in tension; and they snap the valves 38 and 39 into open or closed positions as the links 41 pass the horizontal line.

The tanks 36 and 37 fall and rise with the ends 33 of the beam 30. When tank 36 approaches its lower position, the stem 40 of valve 38 strikes on a step 43, and so is pushed upward, opening the valve 38. When the outside tank approaches its highest position, as at 37, the raised valve 39 strikes against the bottom of the tank 7, is forced down, and is snapped into its closed position by the spring 42.

In Figures I and II, the valve 39, in tank 37, has just been closed; the valve 15 has been thrown; and water is flowing down branch trough 14 to tank 7. Also valve 38 in tank 36 has just been opened; and water is about to flow out and past the valve 38. Note that tank 6 is full of water. Tank 36 is also full, and will continue to receive water by way of tank 6 until valve 15 is thrown to cut off the flow in that direction; as shown in Figure II. The valve gear is adjusted to operate valve 15 so that it will cut off the flow of water to the tank which is being fed just as that tank reaches the bottom of its stroke, and so that it will again allow water to flow to that tank when it reaches its upper position, and its discharge valve has been closed by striking the bottom of the inner fixed tank, or other suitable closing means.

Note also that tank 7 is full of water. Water in these two tanks, 6 and 7, always up to the level of the perforations 8 and 9, acts as a weight to hold the tank down and steady. Other material than water can be used; but I find water the most convenient and quite suitable. At the other extreme: we might use solid cylinders in place of the tanks 6 and 7, and allow the water from the branch troughs to flow onto their upper surfaces, and off them into the tanks 36, 37. Therefore, the water filled inner tank is practically a solid body with which to displace water in the outer tank, and in which to receive flowing water whose destination is the outer tank.

Referring to Figure I: the inner tanks 6 and 7 are fixed, and are both full of water. Tank 36 has descended; the valve 38 has opened against the anvil 43, and the water is about to dump from tank 36. The tank 37 is empty. It has reached the top of its movement; and the valve 39 has been closed by coming into contact with the bottom of the inner tank 7. The valve 15 in the water trough 12 (see Fig. II) has just been thrown to direct the water down branch trough 14 and into the tank 7, and from it to tank 37. In a few moments tank 37 will be filled to the brim; and tank 36 will be empty. Tank 37 will descend, and tank 36 will rise. We see, on observing tank 37 in Figure I that a very small quantity of water will fill it to the brim; as nearly all of the inside of the tank 37 is taken up by tank 7. The quantity of water required to fill the outer tank 37 to the brim when tank 7 is inside it, as shown in Figure I, is equal to the difference between the volumetric capacity of tank 37 and the volume of the outside envelope of the immersed part of the fixed tank 7. Consequently, the smaller the space between the outside wall of tank 7 and the inner wall of tank 37, the smaller will the said difference between them be; and the sooner will the space between them be filled with water flowing at a uniform speed through the trough 14.

When the head of water in tank 37 remains at one level, for instance at the rim, the pressure on the bottom of tank 37 remains the same whatever the immersion of tank 7 into tank 37 may be. For instance: remove tank 7, and fill tank 37 with water; the pressure on the bottom of tank 37 will be that due to the head of water in the tank, multiplied by the area of the bottom of the tank, multiplied by the weight of water for the same units of measurements, and generally expressed in pounds. This is expressed by $HAw$, where $H$ is the head, $A$ is the area, and $w$ is the weight of a unit of water. If the head and area are expressed in inches and square inches, and the weight of water in pounds per cubic inch, the weight of the water in the tank will be $HA$ pounds; and that will be the pressure on the bottom of the tank 37.

Now take the inner tank or solid body 7, which has a bottom area of $a$, and immerse it in the filled tank 37 to a depth of $z$ inches. The immersed volume is $za$, equal to the volume of the quantity of water forced out of the tank 37 by the partial immersion of the tank 7. Then $zaw$ is equal to the weight of the water displaced by the immersion of tank 7; and the upward pressure on the bottom of tank 7 is equal to the weight of the water displaced, and so is equal to $zaw$. The tank 7 is fixed in position, and it cannot rise when pressure is exerted upward against its bottom. Consequently the pressure which is exerted against its bottom is exerted against or reacts against the inside of the bottom of tank 37. This reacting pressure takes the place of the pressure downward which would have been exerted by the displaced water. The pressure downward upon the bottom of the tank 37, if kept full of water, does not change when the inner tank 7 is immersed to any depth in it, the inner tank being held at a fixed position, and the amount of its immersion being determined by the vertical movement of tank 37.

Now, referring to Figure I: tank 37 is in its highest position, is empty, valve 39 is closed, and water is about to flow from trough 14 into tank 7 and from it into tank 37. The small space between the two tanks 7 and 37 will be quickly filled, and in a shorter time than tank 37 would be filled with the same flow of water were not tank 7 inside it. As soon as the water rises to the level of the rim of tank 37, the pressure exerted against the inside bottom of tank 37 will be the same as the pressure which would be exerted against the same bottom by a full tank 37, and with the inner tank 7 withdrawn altogether. These facts take place first with tank 37 and then with tank 36; and the rising and falling of these two tanks will continue as long as water is poured into them from the troughs 14 and 13. The rate of flow is such that the level of the water in the tank which has been filled will remain at that level and not fall until the valve at the bottom of the tank is opened to discharge the water. It will now be seen that the cycle, that is the filling of the movable tanks, their falling, and the discharging of the water from them followed by their rising to their first position, will be more rapidly performed than it would be were we to remove the inner tanks 6 and 7, and rely only upon the outer tanks 36 and 37.

In Figure I, I have shown the power developed by my liquid motor as applied to pump rods 50, 51, operating in cylinders 52 and 53. The power may be applied to any other form of device. I do not confine myself to this application. So, also, I do not confine myself to the form of valve shifting gear shown at 15 to and including 29; for I can use any method by which the water is flowed first to one tank and then to the other, at the proper time. Nor do I confine myself to the types of valves 38 and 39, shown at the bottom of tanks 36 and 37 respectively. Any simple form of valve may be used, provided it is opened and closed with a quick-acting gear, and that it remains open during the upward movement of the tank, to be closed when it reaches its upper position. In Figure I the power developed is transmitted through the medium of a lever or beam. It can also be transmitted through a direct connection; or through a crank, or connecting rod and crank. Transmission of the latter type is shown in Figure III, wherein stationary tanks are shown at 60, 61, 62, and 63. Moving tanks are shown at 64, 65, 66, and 67. These moving tanks are swung from cross-heads 68, which run in guides 69. Connecting rods 70 connect the cross-heads 69 with the cranks 71 on shaft 72. The tank 64 is starting to rise; the tank 65 is about half-way up; the tank 66 about half-way down; while tank 67 is about to start down. Water is conveyed to the tanks in their proper order by any suitable means. My device can also be arranged as a single moving tank suspended from the free end of a beam pivoted or hinged at its other end, and with its associated fixed tank; the suspended tank and the beam being counterbalanced in stable equilibrium by suitable means.

In Figure IV I show an arrangement of the moving and stationary tanks wherein the outer tanks are stationary, and the inner tanks are swung from the end of the beam 89. The outer tanks, 80 and 81, stand on suitable foundations. These tanks have outlet pipes 83 and 84, controlled by the valves 85 and 86, which are operated by the sliding links 87 and 88, hung from the beam 89, which is balanced on the fulcrum 90. The mechanism for controlling the flow of water to the two tanks 80 and 81 may be the same as that shown in Figures I and II. At the upper ends of the tanks 80 and 81 are the inlet pipes 91 and 92, respectively. Assuming that the water has just been directed into the inlet 91 to tank 80: the water will flow down between the wall of the outer tank 80 and the wall of the inner tank 93. The two inner tanks 93 and 94 are swung by the rods 95 from the ends 96 and 97 of the beam 89. The annular passage between the walls of the inner tanks and the walls of the outer tanks is small, and is quickly filled with water. Referring to tanks 80 and 93: as the water rises, an increasing pressure is exerted, in a vertical direction, against the bottom of the inner tank, tending to raise it and the end of the beam 96 to which it is attached by the link 95. The pressure is that due to the displacement of water in the outer tank 80 by the inner tank 93; and as this pressure is exerted in an upward direction, as well as in other directions, it will cause the inner and moveable tank 93 to rise. With this arrangement I use deeper tanks, as the immersion of the inner tanks must be enough throughout the stroke to secure an effective upward pressure. This upward pressure is due to displacement; and the unit pressure per square inch is due to the head rather than to the volume. This unit pressure will be the same, for the same head, whether the annular channel between the inner tanks and outer tanks is small or large. But the smaller this annular channel, and consequently the larger the cross-section of the inner tank, the greater will be the total upward pressure against the bottom of the inner tank, for the same head or depth of immersion.

I claim:

1. In a water motor: a beam pivoted intermediate its ends; a pair of tanks suspended in balance one from each end of the beam; means for conducting water into first one tank and then the other and continuously; valves on each tank for discharging water from the tank when it arrives at the bottom of its movement; and a pair of bodies arranged substantially coaxially one within each of the tanks, and adapted to displace water therein to create a reactive liquid pressure between itself and the bottom of the tank.

2. In a water motor: a beam pivoted intermediate its ends; a tank suspended from one end of the beam; means for counter-balancing the beam and tank in stable equilibrium; means for conducting water into the tank to cause it to descend; means adapted to enter the tank substantially coaxially with the tank and adapted to displace water therein to create a reactive liquid pressure between the tank and the said means; means for stopping the flow of water to the tank when it reaches the bottom of its movement; and valve means on the tank for discharging water from the tank when the tank is at the bottom of its movement.

3. In a water motor: a container adapted for receiving water from a water supply, the said container being open at its upper end; means for supplying water to the container; a body shaped to loosely enter the container so that as water enters the container it shall exert a reacting pressure between the body and the container equal to the weight of the water displaced; and means for applying the said pressure to a power device.

4. In a water motor: a horizontally disposed pivoted beam; a tank adapted to hold a liquid suspended from the free end of the beam; means for balancing the tank and beam in stable equilibrium; means for conducting a liquid into the tank to cause it to sink, the liquid being conducted into the tank during the downward motion of the tank; fixed means arranged substantially coaxially with the tank and adapted to be received within the tank and during the motion of the tank to create a reactive liquid pressure between the fixed means and the bottom of the tank; means for stopping the flow of liquid into the tank as the said tank nears the lower end of its movement; means for discharging the liquid from the tank as it reaches its lowest position; and means for closing the discharge means as the tank returns to its uppermost position.

5. In a water motor: a beam pivoted intermediate its ends; a pair of tanks suspended one from each end of the beam and adapted to oscillate in a vertical plane; a pair of fixed bodies arranged substantially coaxially one with each of the tanks and which it is adapted to enter; a supply of water; means for conducting water to the tanks alternately and continuously during the downward movement of the said tanks; means on each tank for discharging water from the tank when it arrives at the low position of the tank; and means for returning the discharge means to its closed position at the end of the upward movement of each tank.

6. In a water motor: a rotatable shaft having a plurality of cranks spaced equally about its axis; a plurality of tanks suspended from the cranks, and so arranged with the cranks that they will form a counterbalanced system; a plurality of fixed bodies each one mounted substantially coaxially with one of the tanks and adapted to enter into its associated tank as the latter rises during the rotation of the shaft; a supply of water; means for conducting water to each one of the tanks in such order that the shaft will be rotated by the falling of the tanks and during the descent of the tanks; means for discharging the water from each one of the tanks as it reaches its low position; and means for closing the discharge means when its associated tank arrives near its high position.

7. In a water motor: a pivoted beam; a tank suspended from the free end of the beam; a fixed body projecting into the tank and occupying space therein; means for conducting water into the tank and around a part of the downwardly projecting fixed body and for maintaining the level of the water in the tank during downward movement of the said tank; valve means for discharging the water from the tank when the said tank has fallen; and means for returning the valve means to its closed position.

8. In a water motor: a beam pivoted intermediate its ends; a pair of tanks suspended one from each end of the beam and adapted to oscillate in a vertical plane; a pair of fixed bodies each one projecting downward into one of the tank and occupying space therein; means for conducting water to the tanks alternately and for maintaining a high water level in the downwardly moving tank; means for discharging the water from each tank when it arrives near its lowest position; and means for returning the discharge means to its closed position.

GEORGE A. TOWER.